United States Patent [19]

Sproat

[11] Patent Number: 5,270,927
[45] Date of Patent: Dec. 14, 1993

[54] METHOD FOR CONVERSION OF PHONETIC CHINESE TO CHARACTER CHINESE

[75] Inventor: Richard W. Sproat, Franklin Township, Somerset County, N.J.

[73] Assignee: AT&T Bell Laboratories, Murray Hill, N.J.

[21] Appl. No.: 580,411

[22] Filed: Sep. 10, 1990

[51] Int. Cl.⁵ ............................................. G06F 15/38
[52] U.S. Cl. ................................................ 364/419.09
[58] Field of Search ..................... 364/419; 340/365 R; 395/150; 400/110

[56] References Cited

U.S. PATENT DOCUMENTS 5,047,932 9/1991 Hseih .................................. 364/419

OTHER PUBLICATIONS

"Removing the Ambiguity of Phonetic Chinese Input by the Relaxation Technique", Computer Processing of Chinese & Oriental Languages, vol. 3, No. 1, May 1987.
"A Stochastic parts program and noun phrase parser for unrestricted text", K. Church, Second Conf. on Applied Natural Language Processing, 136-142, 1988.

Primary Examiner—Roy N. Envall, Jr.
Assistant Examiner—Khai Tran
Attorney, Agent, or Firm—Thomas A. Restaino

[57] ABSTRACT

A method for converting phonetic Chinese into Chinese characters effectuated by ascertaining an optimal path through a lattice of possible combinations of Chinese characters by calculating the probability of adjacent Chinese characters appearing in Chinese character text.

11 Claims, 5 Drawing Sheets

FIG. 2

CHINESE CHARACTER MATRIX

CHINESE SYLLABLES ($S_1$ - $S_5$)

|  | tai2 | wan1 | you3 | tai2 | feng1 |
|---|---|---|---|---|---|
| CHINESE CHARACTERS ($C_1$ - $C_9$) | 台 | 灣 | 有 | 台 | 風 |
| | 颱 | 彎 | 友 | 颱 | 豐 |
| | 抬 | 豌 | 芛 | 抬 | 峰 |
| | 檯 | 蜿 | 酉 | 檯 | 封 |
| | 臺 | 剜 | 勔 | 臺 | 鋒 |
| | 檯 | | 䏔 | 檯 | 蜂 |
| | 苔 | | | 苔 | 寞 |
| | 抬 | | | 抬 | 飌 |
| | 邰 | | | 邰 | 丰 |

FIG. 3

CHINESE CHARACTER MATRIX

CHINESE SYLLABLES

| | tai 2 | wan 1 | you 3 | tai 2 | feng 1 |
|---|---|---|---|---|---|
| CHINESE CHARACTERS | a<br>b<br>•<br>•<br>•<br>•<br>•<br>• | c<br>d<br>•<br>•<br>• | e<br>f<br>•<br>•<br>• | a<br>b<br>•<br>•<br>•<br>•<br>•<br>• | g<br>h<br>•<br>•<br>•<br>•<br>•<br>• |

FIG. 4

FREQUENCY MATRIX REFLECTING USE
OF ADJACENENT CHINESE CHARACTERS
$(C_{i-1}, C_i)$ IN CHINESE TEXT $C_i$

| | | a<br>台 | b<br>颱 | c<br>灣 | d<br>彎 | e<br>有 | f<br>友 | g<br>風 | h<br>豐 | i<br>。 |
|---|---|---|---|---|---|---|---|---|---|---|
| | a 台 | 5 | 0 | 1513 | 0 | 1 | 0 | 2 | 0 | 22 |
| | b 颱 | 0 | 0 | 0 | 0 | 0 | 0 | 29 | 0 | 0 |
| | c 灣 | 1 | 0 | 2 | 0 | 26 | 0 | 2 | 0 | 16 |
| | d 彎 | 0 | 0 | 0 | 2 | 0 | 0 | 0 | 0 | 1 |
| $C_{i-1}$ | e 有 | 25 | 2 | 0 | 1 | 15 | 0 | 12 | 11 | 30 |
| | f 友 | 0 | 0 | 0 | 0 | 2 | 3 | 0 | 0 | 26 |
| | g 風 | 0 | 0 | 0 | 0 | 3 | 0 | 7 | 0 | 41 |
| | h 豐 | 0 | 0 | 0 | 0 | 0 | 0 | 0 | 0 | 6 |
| | i 。 | 322 | 0 | 6 | 1 | 315 | 4 | 3 | 8 | 42 |

FIG. 5

|    | BEG | tai2 | wan1 | you3 | tai2 | feng1 | END |   |   |   |   |   |   |   |   |   |
|----|-----|------|------|------|------|-------|-----|---|---|---|---|---|---|---|---|---|
| 1. | i   | a    | c    | e    | a    | g     | ::  | 322 | 1513 | 26 | 25 | 2 | 41 | = | 25,967,013,800 |
| 2. | i   | a    | c    | e    | a    | h     | ::  | 322 | 1513 | 26 | 25 | 0 | 6  | = | 30,121,736,008 |
| 3. | i   | a    | c    | e    | b    | g     | ::  | 322 | 1513 | 26 | 2  | 29 | 41 | = | 0 |
| 4. | i   | a    | c    | e    | b    | h     | ::  | 322 | 1513 | 26 | 2  | 0  | 6  | = | 0 |
| 5. | i   | a    | c    | f    | a    | g     | ::  | 322 | 1513 | 0  | 0  | 2  | 41 | = | 0 |
| 6. | i   | a    | c    | f    | a    | h     | ::  | 322 | 1513 | 0  | 0  | 0  | 6  | = | 0 |
| 7. | i   | a    | c    | f    | b    | g     | ::  | 322 | 1513 | 0  | 0  | 29 | 41 | = | 0 |
| 8. | i   | a    | c    | f    | b    | h     | ::  | 322 | 1513 | 0  | 0  | 0  | 6  | = | 0 |
| 9. | i   | a    | d    | e    | a    | g     | ::  | 322 | 0    | 25 | 25 | 2  | 41 | = | 0 |
| 10.| i   | a    | d    | e    | a    | h     | ::  | 322 | 0    | 25 | 25 | 0  | 6  | = | 0 |
| 11.| i   | a    | d    | e    | b    | g     | ::  | 322 | 0    | 2  | 2  | 29 | 41 | = | 0 |
| 12.| i   | a    | d    | e    | b    | h     | ::  | 322 | 0    | 2  | 2  | 0  | 6  | = | 0 |
| 13.| i   | a    | d    | f    | a    | g     | ::  | 322 | 0    | 0  | 0  | 2  | 41 | = | 0 |
| 14.| i   | a    | d    | f    | a    | h     | ::  | 322 | 0    | 0  | 0  | 0  | 6  | = | 0 |
| 15.| i   | a    | d    | f    | b    | g     | ::  | 322 | 0    | 0  | 0  | 29 | 41 | = | 0 |
| 16.| i   | a    | d    | f    | b    | h     | ::  | 322 | 0    | 0  | 0  | 0  | 6  | = | 0 |
| 17.| i   | b    | c    | e    | a    | g     | ::  | 0   | 0    | 26 | 25 | 2  | 41 | = | 0 |
| 18.| i   | b    | c    | e    | a    | h     | ::  | 0   | 0    | 26 | 25 | 0  | 6  | = | 0 |
| 19.| i   | b    | c    | e    | b    | g     | ::  | 0   | 0    | 26 | 2  | 29 | 41 | = | 0 |
| 20.| i   | b    | c    | e    | b    | h     | ::  | 0   | 0    | 26 | 2  | 0  | 6  | = | 0 |
| 21.| i   | b    | c    | f    | a    | g     | ::  | 0   | 0    | 0  | 0  | 2  | 41 | = | 0 |
| 22.| i   | b    | c    | f    | a    | h     | ::  | 0   | 0    | 0  | 0  | 0  | 6  | = | 0 |
| 23.| i   | b    | c    | f    | b    | g     | ::  | 0   | 0    | 0  | 0  | 29 | 41 | = | 0 |
| 24.| i   | b    | c    | f    | b    | h     | ::  | 0   | 0    | 0  | 0  | 0  | 6  | = | 0 |
| 25.| i   | b    | d    | e    | a    | g     | ::  | 0   | 0    | 25 | 25 | 2  | 41 | = | 0 |
| 26.| i   | b    | d    | e    | a    | h     | ::  | 0   | 0    | 25 | 25 | 0  | 6  | = | 0 |
| 27.| i   | b    | d    | e    | b    | g     | ::  | 0   | 0    | 2  | 2  | 29 | 41 | = | 0 |
| 28.| i   | b    | d    | e    | b    | h     | ::  | 0   | 0    | 2  | 2  | 0  | 6  | = | 0 |
| 29.| i   | b    | d    | f    | a    | g     | ::  | 0   | 0    | 0  | 0  | 2  | 41 | = | 0 |
| 30.| i   | b    | d    | f    | a    | h     | ::  | 0   | 0    | 0  | 0  | 0  | 6  | = | 0 |
| 31.| i   | b    | d    | f    | b    | g     | ::  | 0   | 0    | 0  | 0  | 29 | 41 | = | 0 |
| 32.| i   | b    | d    | f    | b    | h     | ::  | 0   | 0    | 0  | 0  | 0  | 6  | = | 0 |

METHOD FOR CONVERSION OF PHONETIC CHINESE TO CHARACTER CHINESE

FIELD OF THE INVENTION

This invention relates to automated methods for converting phonetic Chinese to character Chinese.

BACKGROUND OF THE INVENTION

Because the Chinese language uses thousands of characters—in contrast to the English language's use of 26 characters—the development of modern Chinese word processing equipment is a substantial problem. Obviously, a typewriter keyboard consisting of thousands of keys is impractical.

Phonetic (sometimes called phonemic) input schemes, based on the use of normal keyboards, are often used to input Chinese character text into a computer or word processor. These schemes known as the Mandarin Phonetic system in Taiwan and the Hanyu Pinyin system in the People's Republic of China involve the transliteration, for example, of the five following Chinese characters:

台 灣 有 颱 風 respectively into the five following single syllables reflecting the pronunciation of the Chinese characters:

tai2 wan1 you3 tai2 feng1

Because this phonemic input does not require special keyboards or the mastery of special coding schemes, its use is advantageous. However, since the number of pronounced Chinese syllables is significantly fewer than the number of Chinese characters, it suffers from the problem of ambiguity. A well-educated Chinese may be expected to know about 6000 characters, but the number of syllables is about 1200. Thus, one syllable may represent many different characters. For example, in the Hanyu Pinyin transliteration system, all the following characters are pronounced shi4:

是 事 市 式 世 示 士 視 拭 試 柿 室
勢 釋 氏 飾 侍 逝 嗜 仕 蝕 恃 拭 匙
拭 弒 鈦 柿 奭 筮 柿 尺 促 伊

Not surprisingly, translation of the 5-syllable phrase tai2 wan1 you3 tai2 feng1 into Chinese characters presents over 21,000 (i.e., 9×5×6×9×9) different combinations of characters since "tai2", "wan1", "you 3", "tai2", and "feng1" respectively represent at least 9,5,6,9, and 9 different Chinese characters.

As described in their paper ("Removing the Ambiguity of Phonetic Chinese by the Relaxation Technique,'- 'Computer Processing of Chinese & Oriental Languages Vol. 3, No. 1, May 1987) Lin and Tsai, attempting to overcome the above-described ambiguity problem, propose a method of converting phonetic Chinese syllables to character Chinese using the relaxation process widely used in image analysis problems, such as edge detection, curve detection and shape recognition. More specifically, they employ the relaxation process to obtain the optimal path through the lattice of possible characters, making use of the lexical probabilities of the characters given the syllables and the transition probabilities of adjacent characters and adjacent syllables.

SUMMARY OF THE INVENTION

I have discovered a simpler, yet equally effective, method for converting phonetic Chinese into Chinese characters. In accordance with the principles of my invention, this conversion is effected by obtaining the optimal path through the lattice of possible Chinese characters by calculating only the probability of adjacent Chinese characters appearing in text.

More specifically, an automated method is disclosed for converting n phonetic Chinese syllables $S_1$ through $S_n$ in a text into n Chinese characters $C_1$ through $C_n$. In accordance with my method, for each Chinese syllable $S_i$, I generate a group of Chinese characters $C_{i1}$ through $C_{iz}$, collectively referenced as $C_{i1-z}$, possibly corresponding thereto. Then I compute the optimal path through the lattice of possible Chinese characters $C_{11-z}$ through $C_{n1-z}$ to derive the mostly likely n Chinese characters $C_1$ through $C_n$ corresponding to the n phonetic Chinese syllables $S_1$ through $S_n$. This optimal path is beneficially computed, in accordance with the principles of my invention, by deriving the probability of the use of adjacent Chinese characters $C_i$ and $C_{i-1}$ in said text based upon the frequency of the ordered appearance of said adjacent Chinese characters in a large corpus of Chinese text, multiplying together the derived probabilities, and selecting the path with the highest probability as the optimal path.

BRIEF DESCRIPTION OF THE DRAWING

Further features and advantages of my invention will become apparent from the following detailed description, taken together with the drawing, in which:

FIG. 2 is a Chinese character matrix indicating the possible Chinese characters ($C_1$-$C_9$) corresponding to each of the particular Chinese syllables ($S_1$-$S_5$);

FIG. 3 discloses the same Chinese character matrix shown in FIG. 2, but, where for ease of explanation, the Chinese characters have been replaced by English letters "a" through "h";

FIG. 4 is a matrix reflecting the number of times representative Chinese characters ("a" through "h") appeared adjacent one other in a large corpus of Chinese character text; and FIG. 5 shows how the frequency numbers of FIG. 4 are used to compute the optimum path through the matrix of FIG. 3 to thereby select the Chinese characters most likely corresponding to the particular Chinese syllables.

DETAILED DESCRIPTION

Figure 1:
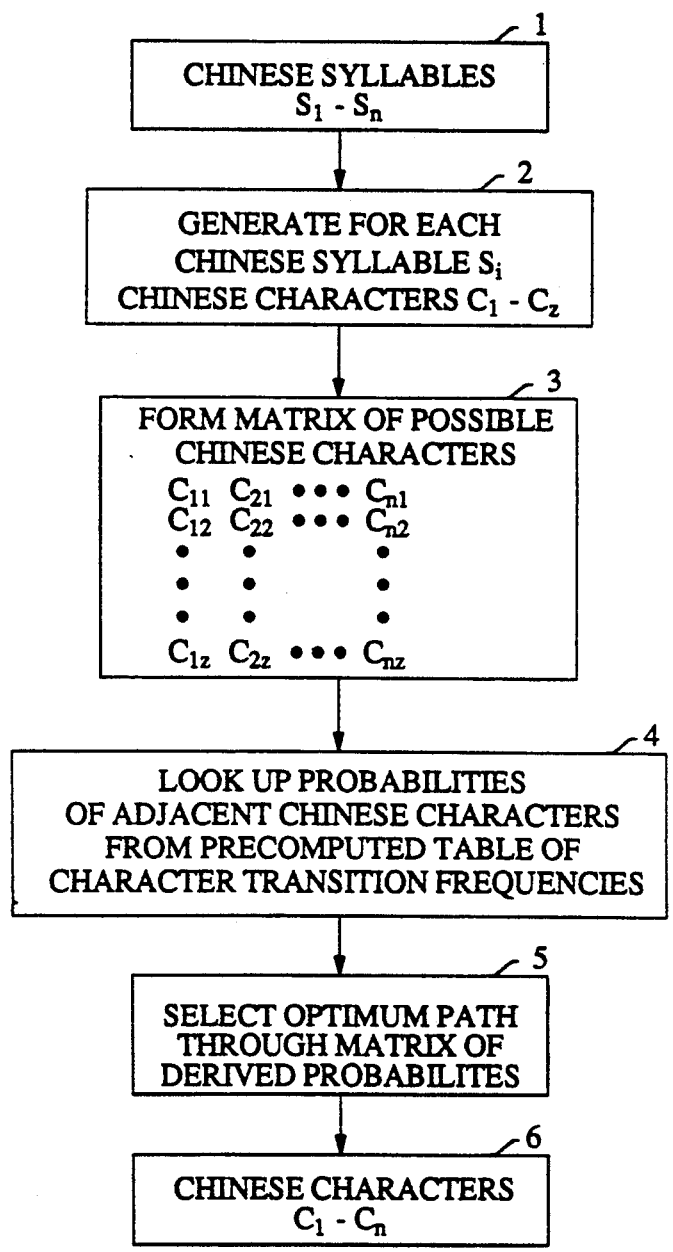
FIG. 1 is a flow diagram of the Chinese syllable to Chinese character conversion method according to my invention.

I will now describe my invention in terms of selecting the optimal path through the lattice of Chinese characters generated from a phonetic input. So consider the example below in which the phonetic Chinese syllables ("tai2", "wan1", "you3", "tai2", "feng1") each refer respectively to one of the Chinese characters found beneath it. Thus, "wan1" refers to one of the five Chinese characters beneath it, and "you3" refers to one of the six Chinese characters beneath it

| tai2 | wan1 | you3 | tai2 | feng1 |
|------|------|------|------|-------|
| 台   | 灣   | 有   | 台   | 風    |
| 颱   | 彎   | 友   | 颱   | 豐    |
| 抬   | 玩   | 芙   | 抬   | 峰    |
| 檯   | 蜿   | 酉   | 檯   | 封    |
| 臺   | 剜   | 勘   | 臺   | 鋒    |

-continued

| tai2 | wan1 | you3 | tai2 | feng1 |
|------|------|------|------|-------|
| 惨 |  | 關 | 惨 | 蜂 |
| 苔 |  |  | 苔 | 鳳 |
| 抬 |  |  | 抬 | 風 |
| 邰 |  |  | 邰 | 丰 |

The circled Chinese characters represent the most likely path through the lattice, that is, the sentence in Chinese: "Taiwan has typhoons."

I will now describe the methodology used to select the optimum path in the above-described example in accordance with the principles of my invention. Step 1 of FIG. 1 identifies the starting point of my method as the Chinese syllables $S_1$ through $S_n$ or, in the illustrative example, $S_1$ through $S_5$ corresponding to the Chinese syllables "tai2", "wan1", "you3", "tai2" and "feng1", respectively. In accordance with step 2 of FIG. 2, Chinese characters $C_1$ through $C_Z$, representing all possible Chinese characters corresponding to a particular Chinese syllable, are generated for each Chinese syllable $S_i$, where the numbers of such characters "z" will vary for each Chinese syllable. Thus, with reference to FIG. 2 which shows the matrix formed by the generation of such Chinese characters, "z" is 9 for "tai2" since "tai2" represents one of nine possible characters, "z" is 5 for "wan1" since "wan1" represents one of five possible characters, "z" is 6 for "you3" as shown, and "z" is 9 for "feng1" since, as shown, "feng1" represents one of nine possible characters.

In accordance with step 3 of FIG. 1, the generated Chinese characters are formed into a matrix where the characters generated for the first syllable form the left hand column $C_1$ and the characters generated for the last syllable (number n) form the right hand column $C_n$. Thus, with reference to the matrix in FIG. 2, Chinese character $C_1$ for "tai2" (which is really character $C_{11}$ in the matrix following the numbering methodology of step 3 of FIG. 1) is the first Chinese symbol under "tai2", Chinese character $C_2$ for "tai2" (which is character $C_{12}$ in the matrix) is the second Chinese symbol under "tai2", Chinese character $C_3$ for "tai2" (which is character $C_{13}$ in the matrix) is the third Chinese symbol under "tai2", and so on until Chinese character $C_9$ for "tai2" (which is character $C_{19}$ in the matrix) is the ninth Chinese symbol under "tai2".

Chinese character $C_1$ for "wan1" is the first Chinese symbol under "wan1" and would be designated $C_{21}$ in accordance with the numbering scheme of FIG. 1 since it is the first symbol for the second character. Similarly, Chinese character $C_2$ for "wan1" is the second Chinese symbol under "wan1" and would be designated $C_{22}$ in accordance with the numbering scheme of FIG. 1 since it is the second symbol for the second character. Finally, the last Chinese character $C_5$ for "wan1" is the fifth Chinese symbol under "wan1" and would be designated $C_{25}$ in accordance with the numbering scheme of FIG. 1 since it is the fifth symbol for the second character.

Chinese character $C_1$ for the last symbol "feng1" (i.e., $S_5$) is the first Chinese symbol under "feng1" and would be designated $C_{51}$ in accordance with the numbering scheme of FIG. 1 since it is the first symbol for the fifth character. The last symbol in the matrix found at its bottom right corner is $C_9$ for "feng1" since it is the ninth symbol under "feng1" and is designated $C_{59}$ since it is the ninth symbol for the fifth character.

FIG. 3 depicts the same Chinese character matrix as that shown in FIG. 2, but, where for ease of explanation later of the selection of the optimum path through this matrix, some of the Chinese symbols have been replaced by the English designations "a" through "h". Thus, "a" in FIG. 3 represents the first symbol under "tai2" in FIG. 2, "b" in FIG. 3 represents the second symbol under "tai2", "c" in FIG. 3 represents the first symbol under "wan1" in FIG. 2, and so on. These designations are arbitrary (except identical Chinese characters obviously are identified by the same English designation) and serve only to facilitate further explanation of the principles of my invention.

FIG. 4 shows a frequency matrix reflecting the use of adjacent Chinese characters $(C_{i-1}, C_i)$ in a large corpus of Chinese text. This matrix was derived by analysis of the corpus and noting the number of times ordered pairs of Chinese characters appeared in the text. Again, for ease of explanation, the same English letters "a" through "h", used in FIG. 3, are again used respectively to identify the adjacent Chinese characters shown in FIG. 4. The letter "i" refers to the Chinese sentence delimiter (Chinese 'period'), and as hereinafter explained, is used to delineate the beginning and the end of phrase of Chinese text. Since the number of Chinese characters is quite large, FIG. 4 shows only a representative portion of the actual frequency matrix which is approximately a 6000 by 6000 matrix and represents use of 6000 Chinese characters.

FIG. 4 shows the number of times ordered pairs of Chinese characters $(C_{i-1}, C_i)$ appeared in the corpus. For example, the pair "aa" appeared 5 times in the Chinese corpus since the number 5 appears for $C_{i-1}=a$, and $C_i=a$. Similarly, the pair "ab" appeared 0 times since the number 0 appears for $C_{i-1}=a$, and $C_i=b$. On the other hand, the pair "ac" appeared 1513 times (see, $C_{i-1}=a$, and $C_i=c$). One notices immediately, that while the pair "ac" is found quite frequently in Chinese text, its inverse—namely "ca"—is found only infrequently (e.g., "1" in FIG. 4). One notices readily that many pairs were not found at all in the corpus—see, for example, "ab", "af", "ah", "ba", "bb", "bc" and so on.

The letter "i" in FIG. 4 refers to the Chinese sentence delimiter and is used to pad both ends of an input sequence. Thus, where "a" is the first character, the ordered pair $(C_{i-1}, C_i)$ really constitutes the pair "ia". Similarly, where "a" is the last character, the ordered pair $(C_{i-1}, C_i)$ really constitutes the pair "ai". FIG. 4, therefore, indicates that "a" was the first character 322 times (see $C_{i-1}=i$, $C_i=a$) and that "a" was the last character only 22 times (see $C_{i-1}=a$, $C_i=i$).

Returning now to FIG. 3, our goal is to find the optimum path through the 9 by 5 matrix (comprising $C_{11}$ through $C_{59}$) using the frequency information of FIG. 4 to thereby identify the five Chinese characters most likely corresponding to the five Chinese syllables "tai2 wan1 you3 tai2 feng1". More specifically, there are 21,870 possible paths through matrix (i.e., $9 \times 5 \times 6 \times 9 \times 9$). One path would be that shown in the first row in FIG. 3—"aceag". Another path would be that shown in the second row—"bdfbh". Of course, by combining the first and second rows, other possible paths can be derived easily—e.g., "adfbh", "bdeag", etc. In fact, FIG. 5 shows the 32 combinations possible by combining just the symbols in the first and second rows in FIG. 3. The path "aceag" is listed as the first path in FIG. 5, "aceah" is listed as the second path, "acebg" the third . . . and "bdfbh". the last path.

FIG. 5, also, shows to the right of each path the frequency calculation used to derive the optimum path. For example, the frequency calculation (or probability calculation) for the first path "aceag" is derived by looking up in FIG. 4 the individual ordered occurrence frequencies for the following pairs "ia", "ac", "ce", "ea", "ag", "gi"—namely, 322, 1513, 26, 25, 2, 41. Then these six numbers are multiplied together to derive the score for the use of the Chinese characters "aceag" resulting in the large number 25,967,013,800 shown in line 1 of FIG. 5. The only other probable path is shown on the third line—namely, "acebg"—and, in fact, represents the optimum path because the calculated probability number 30,121,736,008 is larger than any other calculated number. Thus, the Chinese characters "acebg" are selected as representing those characters defined by the Chinese symbols "tai2 wan1 you3 tai2 feng1" and, in fact, recite the sentence in Chinese: "Taiwan has typhoons."

In more mathematical terms, I have discovered that the optimal path through the matrix represented by the Chinese characters can be derived by reference to the following formula where "c" refers to a Chinese character and $p(c_i|c_{i-1})$ refers to the probability of Chinese character i, given the previous adjacent occurrence of Chinese character $i-1$:

$$\operatorname*{argmax}_{i=1} \prod^{n-1} p(c_i|c_{i-1})$$

Conceptually one enumerates all of the possible paths though the lattice and then picks the best path according to the above formula. Of course, truly enumerating all possible paths is computationally expensive. However, as indicated in the above formula and previous discussion, the score for the entire path is computed by multiplying out the probabilities (frequencies) for adjacent pairs of characters, and one can therefore significantly reduce the paths that one has to consider by using dynamic programming (=Viterbi algorithm) techniques. In formal terms, note that for any syllable $syl_i$, and for each $c_{i,j}$ (a Chinese character corresponding to $syl_i$), one is considering the scores of all paths which end in $c_{i,j}$. Note however, that we only need to keep the best path ending in $c_{i,j}$. This is because when we move on to the next syllable $syl_{i+1}$ and consider all characters $c_{i+1,k}$, we want to compute the scores for paths ending in the pair of characters $c_{i,j}c_{i+1,k}$ (as well as the scores for paths ending in other characters corresponding to the pair $syl_isyl_{i+1}$); we do this computation for each path ending in $c_{i,j}$, by multiplying the score for that path by the frequency of occurrence of the pair of characters $c_{i,j}c_{i+1,k}$, $freq(c_{i,j}c_{i+1,k})$. However, it is clear even before we perform these calculations that we really only need to consider the best scoring path ending in $c_{i,j}$; since the same multiplier $freq(c_{i,j}c_{i+1,k})$ is used to compute the frequency of each path ending in the pair $c_{i,j}c_{i+1,k}$, the best path ending in the pair $c_{i,j}c_{i+1,k}$ will simply be the best path ending in $c_{i,j}$ concatenated with the character $c_{i+1,k}$. We therefore discard all but the best scoring path leading up to $c_{i,j}$. Thus, rather than keeping around $cc_1 \cdot cc_2 \ldots cc_{i-1}$ paths (where $cc_m$ is the number of characters possibly corresponding to $syl_m$) ending in $c_{i,j}$, we only keep one. To illustrate, let us return to FIG. 5, which, as we have noted, represents a subset of the possible paths through the lattice given in FIG. 3. Suppose that we are considering syllable "wan1", in the third column of FIG. 5. Note that there are four distinct possible paths illustrated in FIG. 5 which end in possible transliterations of "wan1", namely:

"iac", the initial subpath of the final paths numbered 1-8;

"iad", the initial subpath of the final paths numbered 9-16;

"ibc", the initial subpath of the final paths numbered 17-24;

"ibd", the initial subpath of the final paths numbered 25-32.

Following the above formal description, we can eliminate "ibc" because its score $0 \times 0 = 0$ obviously does not compete with the score of the other path ending in "c", namely "iac", whose score at this point is $322 \times 1513 = 487,186$. (Note that in practice the value 0 is not actually used, but rather an arbitrarily chosen very small valued constant; this is for technical reasons which do not affect the discussion here.) Naturally, there is no way that longer paths "ibce", "ibcf" can compete with "iace" or "iacf", respectively, either; this is because at the point we compute the scores for those paths, we are multiplying the scores for the pairs "ce" and "cf" with the scores for the paths "ibc" and "iac" and since we already know that "ibc" is an inferior candidate to "iac", it follows that "ibce" and "ibcf" are inferior candidates, respectively, to "iace" and "iacf". The subpath "ibc" can therefore be eliminated from further consideration. Both of the paths ending in "d", "iad" and "ibd" have 0 scores, and in principle we could eliminate both of these, but in practice one of them—this case "iad"—is kept around; it will be eliminated in later steps. At this point, then, we have eliminated two paths—"ibc" and "ibd"—and retained two—"iac" and "iad". Moving on to the syllable "wan1" in the fourth column of FIG. 5, we now have to consider the following possible paths:

"iace", the initial subpath of the final paths numbered 1-4;

"iacf", the initial subpath of the final paths numbered 5-8;

"iade", the initial subpath of the final paths numbered 9-12;

"iadf", the initial subpath of the final paths numbered 13-16.

Of those paths ending in "e", namely "iace" and "iade", the former has a value of $322 \times 1513 \times 26 = 12,666,836$ and the latter a value of $322 \times 0 \times 0 = 0$; "iade" is therefore eliminated from further consideration. Of those paths ending in "f", namely "iacf" and "iadf", both have a value of 0 ($322 \times 1513 \times 0$ and $322 \times 0 \times 0$ respectively); as above, one of these—in this case "iacf"—is kept around in practice. At this point we have kept only two paths "iace" and "iacf", and have eliminated six other possibilities; "iade" and "iadf" were eliminated on this step; and "ibce", "ibcf", "ibde", "ibdf" were eliminated on the previous step because of the elimination of "ibc" and "ibd" on that step.

The frequency statistics of FIG. 4 used in the illustrative embodiment were derived from a corpus of 2.6 million characters of Chinese newspaper text. Estimates of the probabilities of the appearance of 2 adjacent Chinese characters can be derived by dividing the frequency of occurrence of a sequence by the size of the corpus. However, since all probability estimates thus derived represent the frequency divided by the corpus size, in practice, the corpus size is omitted from the calculation since it does not affect the maximization (thus the use of frequency rather than estimated probability in the above illustrative description of my method).

To evaluate the effectiveness of my method, seven short samples of text of differing length were chosen, representative of various writing styles ranging from very classical to colloquial:

i) Ad [classical]
ii) Report [classical]
iii) Newspaper social commentary taken from the training corpus [semi-classical]
iv) Essay [more colloquial]
v) Narrative [more colloquial]
vi) Short story [colloquial]
vii) Exposition [colloquial].

The performance of my method is given in the table in terms of percentage correct by character (hit rate) for each of the styles; the hit rate from my method is specified in the third column and should be compared with the hit rate achieved by merely picking the most common character given the pronounciation, which is given in the second column:

| Style | Lexical Probabilities Only | My Method |
| --- | --- | --- |
| i [class.] | 76% | 93% |
| ii [class.] | 73% | 90% |
| iii [semi-class.] | 76% | 98% |
| iv [more coll.] | 69% | 73% |
| v [more coll.] | 72% | 86% |
| vi [coll.] | 71% | 89% |
| vii [coll.] | 71% | 92% |
| Total | 73% | 90% |

A trend evident in these data is that there is some dependence upon style: my current training corpus is heavily classical in style since it is mostly derived from newspapers. As a consequence, texts (i-iii) which are classical in style are better rendered than the more colloquial texts, with the exception of (vii). I expect that this style dependence would become less marked if the training corpus were expanded to include other styles.

Other modifications and applications of my invention will be apparent to those skilled in the art and are also within its spirit and scope.

What is claimed is:

1. An automated method for converting signals representing n phonetic Chinese syllables $S_1$ through $S_n$ in a text into signals representing n Chinese characters $C_1$ through $C_n$ comprising the steps of:

generating for each signal representing a Chinese syllable $S_i$ a group of signals representing Chinese characters $C_{i1}$ through $C_{iz}$, collectively referenced as $C_{i1-z}$, corresponding thereto, to form a lattice of signals representing Chinese characters $C_{11-z}$ through $C_{n1-z}$, computing a score for each of one or more paths through the lattice of signals representing Chinese characters $C_{11-z}$ through $C_{n1-z}$ each path reflecting a sequence of n Chinese characters corresponding to the n phonetic Chinese syllables $S_1$ through $S_n$; and generating signals representing n Chinese characters $C_1$ through $C_n$ based on the path through the lattice having a score reflecting a most likely sequence of character signals in the lattice;

said computing step comprises deriving a probability of the use of adjacent Chinese characters $C_i$ and $C_{i-1}$ in said text based upon a frequency of the ordered appearance of said adjacent Chinese characters in a large corpus of Chinese text, and determining a score for each of the one or more paths through the lattice by multiplying together the derived probabilities.

2. The method of claim 1 further characterized in that:

said computing step is effected using dynamic programming techniques.

3. The method of claim 1 wherein the corpus of Chinese text comprises one or more corpora of Chinese texts representative of one or more Chinese language styles.

4. An automated method for converting signals representing one or more phonetic syllables of a language into signals representing one or more language characters, the method comprising the steps of:

generating for each signal representing one or more phonetic syllables a group of signals representing one or more language characters corresponding thereto to form a lattice of signals representing characters; and computing a measure of likelihood for each of one or more paths through the lattice of signals representing characters, each path reflecting a sequence of characters corresponding to the one or more phonetic syllables, the measure of likelihood of the path based upon one or more measures of likelihood of occurrence of successive characters of the path appearing in a corpus of language text; and generating signals representing a plurality of language characters based on the path through the lattice having a measure of likelihood reflecting a most likely sequence of character signals in the lattice.

5. The method of claim 4 wherein the step of computing comprises determing a measure of likelihood for the path by combining measures of likelihood for successive pairs of character signals in the path.

6. The method of claim 5 wherein measures of likelihood for successive pairs of character signals are combined by multiplication.

7. The method of claim 4 wherein the corpus of language text comprises one or more corpora of language texts representative of one or more language styles.

8. The method of claim 4 wherein the language is Chinese.

9. The method of claim 4 wherein the measure of likelihood is a probability.

10. The method of claim 4 wherein the measure of likelihood is a frequency.

11. The method of claim 4 wherein said computing step is effected using dynamic programming techniques.

* * * * *